J. Barclay,

Bracelet.

No. 4,192. Reissued Dec. 6. 1870.

Witnesses:
C. Mahlers.
E. F. Kastenhuber

Inventor:
John Barclay
per
Van Santvoord & Hauff
Attys

N. PETERS, PHOTO-LITHOGRAPHER, WASHINGTON, D. C.

United States Patent Office.

JOHN BARCLAY, OF BERGEN, NEW JERSEY

Letters Patent No. 94,064, dated August 24, 1869; reissue No. 4,192, dated December 6, 1870.

IMPROVEMENT IN THE MANUFACTURE OF PLATED-METAL BRACELETS.

The Schedule referred to in these Letters Patent and making part of the same.

*To all whom it may concern:*

Be it known that I, JOHN BARCLAY, of Bergen, in the county of Hudson and State of New Jersey, have invented a new and useful Improvement in the Manufacture of Bracelets; and I do hereby declare the following to be a full, clear, and exact description thereof, which will enable those skilled in the art to make and use the same, reference being had to the accompanying drawing forming part of this specification, in which drawing—

Similar letters indicate corresponding parts.

This invention relates to a bracelet which is made of base-metal plates, coated with a more costly metal or other material, and the foundation plate of which is provided with beads at its edges, at such a distance apart that they hug closely the fellow piece of the bracelet, and that, after the two parts of the bracelet have been united, no uncovered portion of the base-metal remains visible, thereby producing a bracelet superior in finish to similar bracelets, as heretofore made, without any increase in the cost of manufacturing the same.

A bracelet made of metal plates, plated or coated with gold or other material, as ordinarily constructed, is formed of two pieces, A B, (see fig. 5,) soldered together at their junctions *a a*. In this figure the letters *b b* designate the covering material, and *c c'*, the foundation plates, on which the coating material is fixed.

Figure 5:
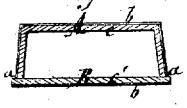
Figure 5 is a transverse section, in an enlarged scale, of a hollow plated-metal bracelet as heretofore commonly made.

The upper portion of the body, or fellow piece, A, of the bracelet, before being applied and fixed to the lower portion or base-plate, B, is bent, so that its cross-section presents the form of a U, as shown in fig. 5. After the fellow piece has been soldered to the base-plate, the edges of the latter have to be filed down even with the outer sides of the fellow piece A, and this leaves the edges of the base metal *c'* exposed, without any coating or plating.

In a bracelet made on my improved plan these uncovered edges are not exposed, but are entirely concealed.

In carrying out my invention, I bend or turn up the lower or base-plate C, (shown in fig. 4,) at each of its opposite ends, in the manner represented in such figure, each edge of the plate, after the bending has been accomplished, resting upon or being directly over the upper or uncoated surface of the plate, the whole being so as to form beads, E E, on the flanks of the plate, and with the coating material *p* on the external or exposed surface of the plate and of the beads.

Figure 4:
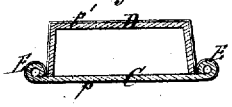
Figure 4 is a similar section thereof in an enlarged scale.

The fellow piece D, bent as shown in section in fig. 4, and having the coating material *p'* on its outer surface, is next to be placed on the base-plate C and between the beads E E, and soldered to said base-plate, the beads being made to fit closely to the sides of the fellow piece D.

Figure 1:
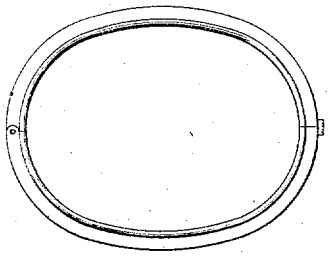
Figure 1 is a plan of this invention.
Figure 2:
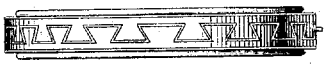
Figure 2 is a side elevation thereof.
Figure 3:
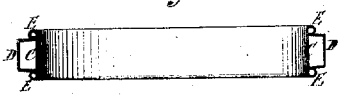
Figure 3 is a transverse section of the same.

By these means a bracelet is obtained such as shown in figs. 1, 2, and 3, the edges of the baser metal being completely concealed and unexposed. Furthermore, the beads E E will render the inner or base-plate C, employed in making the bracelet, much stiffer and stronger than it would be without them, and they also materially improve the appearance of the article.

They will also completely hide the solder from view, and enable it to effect a much firmer union of the two plates.

What I claim as new, and desire to secure by Letters Patent, is—

The improved manufacture or bracelet, as made with the turned parts or beads E E, arranged with respect to the plates C D, in the manner substantially as represented and described.

Witnesses: JOHN BARCLAY.

W. HAUFF,

E. F. KASTENHUBER.